(12) United States Patent
Lin

(10) Patent No.: US 12,093,397 B1
(45) Date of Patent: Sep. 17, 2024

(54) MACHINE LEARNED MODEL FOR GENERATING OPINIONATED THREAT ASSESSMENTS OF SECURITY VULNERABILITIES

(71) Applicant: Rapid7, Inc., Boston, MA (US)

(72) Inventor: Wah-Kwan Lin, Melrose, MA (US)

(73) Assignee: Rapid7, Inc., Boston, MA (US)

( * ) Notice: Subject to any disclaimer, the term of this patent is extended or adjusted under 35 U.S.C. 154(b) by 603 days.

(21) Appl. No.: 17/195,764

(22) Filed: Mar. 9, 2021

(51) Int. Cl.
*G06F 21/57* (2013.01)
*G06N 5/04* (2023.01)
*G06N 20/00* (2019.01)

(52) U.S. Cl.
CPC ............. *G06F 21/577* (2013.01); *G06N 5/04* (2013.01); *G06N 20/00* (2019.01); *G06F 2221/034* (2013.01)

(58) Field of Classification Search
CPC ... G06F 21/577; G06F 2221/034; G06N 5/04; G06N 20/00
See application file for complete search history.

(56) References Cited

U.S. PATENT DOCUMENTS

| | | | | |
|---|---|---|---|---|
| 2015/0033341 A1* | 1/2015 | Schmidtler | ............ | G06N 20/10 726/23 |
| 2015/0163242 A1* | 6/2015 | Laidlaw | .............. | H04L 63/1466 726/22 |
| 2018/0048668 A1* | 2/2018 | Gupta | ................. | H04L 63/1425 |
| 2018/0367561 A1* | 12/2018 | Givental | ................ | G06N 20/00 |
| 2019/0028498 A1* | 1/2019 | Fach | ....................... | G06N 20/00 |
| 2019/0319978 A1* | 10/2019 | Giffard | ............... | G06F 16/2255 |
| 2020/0057857 A1* | 2/2020 | Roytman | ............... | G06N 20/20 |
| 2022/0094709 A1* | 3/2022 | Sharma | ................. | G06F 18/213 |

OTHER PUBLICATIONS

Khalid et al., "Security for Machine Learning-based Systems: Attacks and Challenges during Training and Inference", Dec. 2018, International Conference on Frontiers of Information Technology, pp. 327-332 (Year: 2018).*

* cited by examiner

*Primary Examiner* — Kenneth W Chang
(74) *Attorney, Agent, or Firm* — Ashwin Anand

(57) ABSTRACT

Disclosed herein are methods, systems, processes, and machine learned models for performing opinionated threat assessments for cybersecurity vulnerabilities. An opinionated threat assessment system is implemented that obtains a training dataset that includes a codified opinionated threat assessment for security vulnerabilities. The codified opinionated threat assessment in the training dataset includes intrinsic attributes for the security vulnerabilities and subject attributes about the security vulnerabilities. The opinionated threat assessment system trains an opinionated threat assessment model using the training dataset and according to a machine learning technique where the training tunes the opinionated threat assessment model to generate a machined learned opinionated threat assessment for a new security vulnerability based on new intrinsic attributes associated with the new security vulnerability.

13 Claims, 5 Drawing Sheets

200

PRIOR ART

FIG. 2

MACHINE LEARNED MODEL FOR GENERATING OPINIONATED THREAT ASSESSMENTS OF SECURITY VULNERABILITIES

BACKGROUND

Field of the Disclosure

This disclosure is related is to performing cybersecurity threat assessments. In particular, this disclosure is related to creating, training, and deploying machine learned models for generating opinionated threat assessments for cybersecurity vulnerabilities.

Description of the Related Art

A vulnerability is a weakness in computational log (e.g., code) found in software and hardware components that, when exploited, results in a negative impact to confidentiality, integrity, or availability. Swift identification and mitigation of vulnerabilities in computing systems is of paramount importance to modern security. Although vulnerability management solutions are available, their effectiveness is highly dependent on crucial (and often hard to obtain/analyze) data such as vulnerability research knowledge, exploit knowledge, global attacker behavior, internet-wide scanning data, exposure analytics, and real-time reporting.

Given the disparate nature of data sources (and analysis of the data) required for modern vulnerability management, it is perhaps not surprising that threat assessments of cybersecurity vulnerabilities require significant human expertise and examination. For example, individuals trained and experienced in domains such as penetration testing, among others, are often required at huge cost to modern enterprises both in terms of both time and human capital.

Unfortunately, human-led intervention(s) in such threat assessment efforts is predictably slow and inadequate. For example, the usefulness of particular vulnerabilities to attackers is an important metric. However, collecting desired opinionated feedback from knowledgeable security practitioners requires significant manual effort. Therefore, relying solely on human input(s) in such instances simply does not scale given the large and ever-growing number of un-assessed security vulnerabilities.

SUMMARY OF THE DISCLOSURE

Disclosed herein are methods, systems, process, and machine learning models for generating opinionated threat assessments of security vulnerabilities. One such machine learned method, system, or process involves implementing an opinionated threat assessment system by at least (a) obtaining a training dataset that includes a codified opinionated assessment for each of several security vulnerabilities, where each codified opinionated assessment in the training dataset includes intrinsic attributes and subjective attributes for each of the several security vulnerabilities, and (b) training an opinionated threat assessment model using the training dataset and according to a machine learning technique, where the training tunes the opinionated threat assessment model to generate a machine learned opinionated threat assessment for a new security vulnerability based on new intrinsic attributes associated with the new security vulnerability.

One embodiment involves at least (a) receiving, from an intrinsic attribute collection system, a first dataset that includes sterile inputs indicative of the intrinsic attributes, (b) receiving, from a human curation system, a second dataset that includes user-generated inputs indicative of the subjective attributes, and (c) generating the codified opinionated assessment for the training dataset by combining the first dataset and the second dataset using a common matching key for each of the various security vulnerabilities.

In some embodiments, the intrinsic attribution collection system is a Common Vulnerability Scoring System (CVSS), and the intrinsic attributes include attack vector, age, complexity, or user interaction.

In other embodiments, the human curation system is an attacker knowledge base (AttackerKB) service, and the subjective attributes include an attacker value and an exploitability value for each of the several security vulnerabilities.

In certain embodiments, the opinionated assessment model generates a quantified output that includes a new attacker value and a new exploitability value for the new security vulnerability based only on the new intrinsic attributes associated with the new security vulnerability without requiring new subjective attributes for the new security vulnerability.

In one embodiment, the machine learning technique trains a regression model.

In another embodiment, training the opinionated assessment model includes extrapolating implicit relationships between the intrinsic attributes and user-defined values for each of the several security vulnerabilities that include at least one user-generated input.

The foregoing is a summary and thus contains, by necessity, simplifications, generalizations, and omissions of detail; consequently, those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent by referencing the accompanying drawings and/or figures.

FIG. 2 is a block diagram 200 of AttackerKB's user interface.

Figure 1:
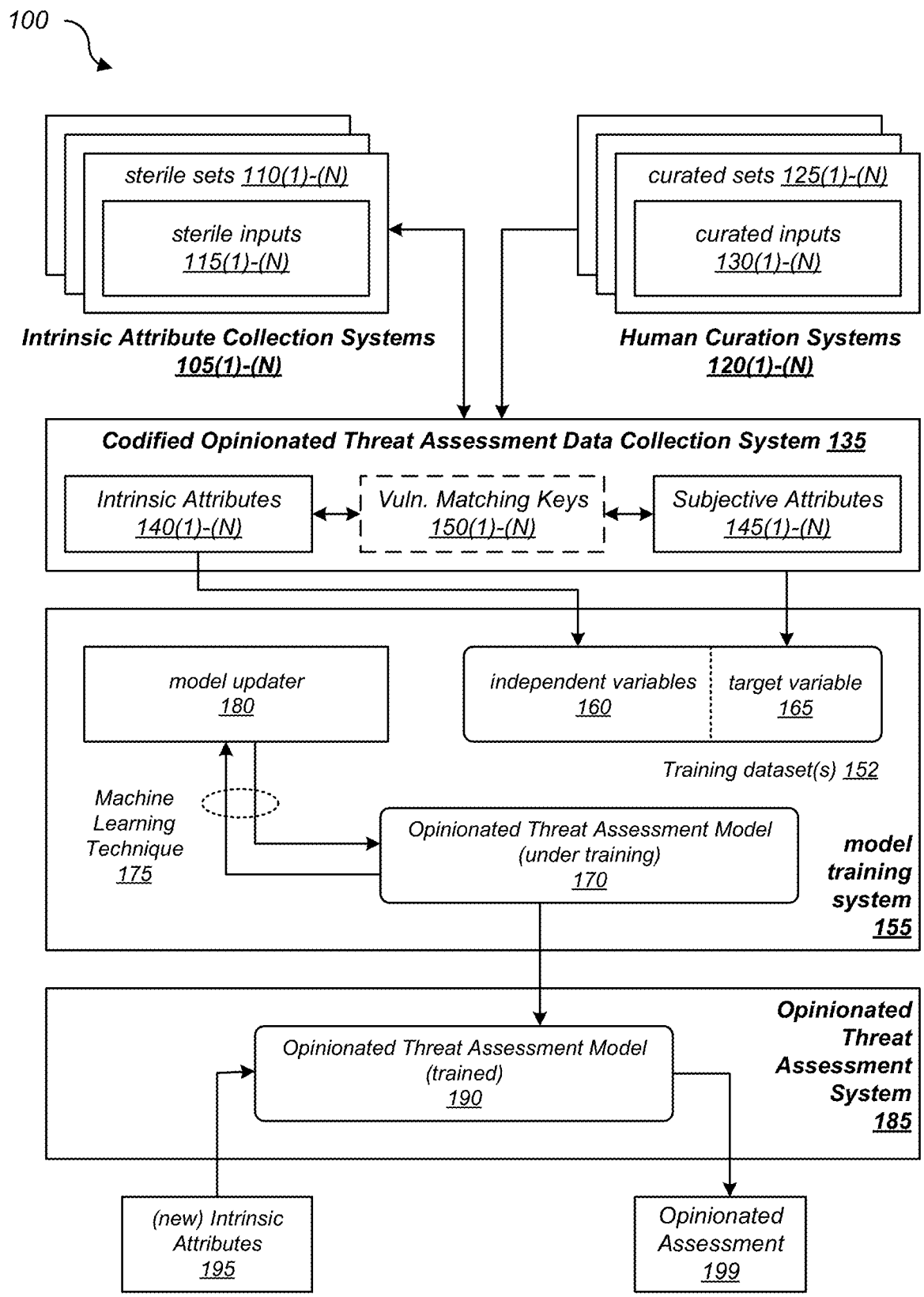
FIG. 1 is a block diagram 100 of an opinionated threat assessment system that implements a trained opinionated threat assessment model trained by a model training system, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Vulnerability management (VM) is the cyclical practice of identifying, classifying, and prioritizing software vulnerabilities. A product such as InsightVM provided by Rapid7®, Inc. of Boston, MA can help enterprises automatically assess and understand risk across their entire infrastructure. Visibility can be had into vulnerabilities that may affect local, cloud, containerized, and virtual infrastructure. An effective VM product depends on accurate and useful data to assess and quantify cyber risk. Therefore, vulnerability assessment is an important part of a vulnerability risk management product.

Vulnerability assessment is the process of identifying, clarifying, quantifying, and prioritizing (or ranking) security vulnerabilities in a computing system. Vulnerability assessment can be used to (a) catalog computing assets and capabilities (resources), (b) assign quantifiable value (or rank order) and importance to those resources, (c) identify vulnerabilities or potential threats to each resource, and (d) assist in mitigating the most serious vulnerabilities for the most valuable resources. InsightVM supplements traditional vulnerability management with robust vulnerability assessment that is bolstered by valuable data related to vulnerability research knowledge, exploit knowledge, global attacker behavior, internet-wide scanning data, exposure analytics, and real-time reporting.

One source of vulnerability metrics is the Common Vulnerability Scoring System (CVSS) which identifies the characteristics and measures the severity of software vulnerabilities. CVSS consists of three metric groups: Base, Temporal, and Environmental. The Base metrics produce a score ranging from 0 to 10, which can then be modified by scoring the Temporal and Environmental metrics. A CVSS score is also represented as a vector string, a compressed textual representation of the values used to derive the score. Two common uses of the CVSS are calculating the severity of vulnerabilities discovered on computing systems and as a factor in prioritization of vulnerability remediation activities. The National Vulnerability Database (NVD) provides CVSS scores for many known vulnerabilities. Therefore, the CVSS provides a way to capture the principal characteristics of a vulnerability (intrinsic or sterile attributes) and produce a numerical score reflecting its severity (e.g., a qualitative/objective representation).

Another source of data that is particularly useful in the realm of vulnerability assessment is data associated with opinionated feedback from security practitioners. While the CVSS can assist in ranking vulnerabilities based on intrinsic or objective attributes, actual subjective attributes from human input is extremely valuable in determining the "usefulness" of particular vulnerabilities to malicious attackers. One source for such human-curated subjective input is AttackerKB, a service that is operated and maintained by Rapid7®, Inc. of Boston, MA. AttackerKB collects opinionated feedback from knowledgeable security practitioners about the usefulness of particular vulnerabilities to attackers (e.g., collecting human input on subjective attributes such as "attacker value" and "exploitability," among others).

Existing paradigms for deriving value from both subjective input data (e.g., human-curated data about subjective attributes such as attacker value and exploitability) from AttackerKB and objective representations from the CVSS (e.g., intrinsic attributes from sterile inputs) involve codifying human input data from AttackerKB (e.g., feedback whether a given vulnerability is useful, enticing, and the like, from an attacker value and exploitability perspective from AttackerKB or any other human curation system) vis-à-vis the intrinsic attributes from the CVSS (or any other intrinsic attribute collection system).

Unfortunately, performing threat assessments of cybersecurity vulnerabilities in this manner requires significant human expertise and examination, often by individuals trained and experienced in such domains as penetration testing, and the like. Perhaps unsurprisingly, collecting human/manual inputs to assess the true threat of vulnerabilities is labor intensive and slow, and is thus often limited in scope. Therefore, relying on human input(s) in such instances simply does not scale given the large and ever-growing number of security vulnerabilities. To wit, AttackerKB currently maintains 300 vulnerabilities with human-curated inputs, where as InsightVM tracks over 170,000 distinct vulnerabilities. It remains unlikely that a large set of known vulnerabilities will ever receive subjective assessments if one is to solely rely on human intervention. Consequently, among other shortcomings, the effectiveness of a vulnerability management solution is negatively affected.

Disclosed herein are methods, systems, processes, and machine learning models for automatically generating opinionated threat assessments of security vulnerabilities.

Example Machine Learned Opinionated Threat Assessment System

FIG. 1 is a block diagram 100 of an opinionated threat assessment (OTA) system that implements a trained OTA model trained by a model training system, according to one embodiment. The model training system of FIG. 1 employs a data-drive approach, using a machine learned OTA model. In some embodiments, the OTA model may accept as input just intrinsic attributes about vulnerabilities and produce as output, an opinionated assessment of a security vulnerability.

In certain embodiments, the OTA model may be a linear regression model that is trained to return an opinionated assessment result indicating at least (a) an attacker value and (b) an exploitability value of a security vulnerability. For example, the OTA model can be trained using a machine learning technique (e.g., via a form of supervised training), where the OTA model is trained using a set of training data labeled with truth labels (e.g., human-inputted "attacker values" and "exploitability values" for particular vulnerabilities). Each observation record in the training dataset can include a set of independent variables represent the OTA model's inputs (e.g., sterile inputs on vulnerabilities through the CVSS or any other intrinsic attribute collection system) and a set of target variables (e.g., the human-input subjective attributes or truth labels) representing the OTA model's desired output(s). The OTA model is then trained to accurately predict the truth label values based on the input features of the observation records.

To obtain truth data for the OTA model, embodiments of the OTA system disclosed herein obtain data related to how security practitioners have treated previous vulnerabilities based on at least (a) attacker value and (b) exploitability value in vulnerability assessment and vulnerability validation environments. The results of how security practitioners have subjectively opinionated on vulnerabilities regarding attacker value and exploitability from human curation systems are used to populate the target variable. The target variable is then used to label training data records that include relevant objective features (e.g., intrinsic attributes). In some embodiments, the intrinsic attributes and subjective attributes may be gathered in automated processes, for example, by a machine monitoring service (e.g., a codified OTA data collection system). The OTA model can also be updated using additional training enabling flexibility to adapt to changes in the cybersecurity landscape.

In some embodiments, the OTA model training system may be accessible by security practitioners (or to security analysts) in a security operations center (SOC) to create custom OTA models. Different security practitioners may have different opinions or first-hand experiences and knowledge about relevant input variables, useful target variables, and/or model parameters. The OTA model training system may provide a configuration interface to permit security analysts and practitioners to configure threat assessment parameters of the OTA model to create custom OTA models to suit their specific preference.

As will be appreciated by those skilled in the art, the disclosed methods, systems, and processes to build and use the OTA model provide numerous technical improvements to enhance the functioning of existing cyber threat assessment systems in the state of the art. These and other features and benefits of such methods, systems, and processes are described in further detail below, in connection with the figures.

As previously noted, FIG. 1 illustrates an OTA model training system, according to certain embodiments. As shown, FIG. 1 depicts a model training system 155 that is used to training an OTA model 170, using one or more training datasets. In this example, the training datasets are built using a codified OTA data collection system 135. Depending on the embodiment, codified OTA data collection system 135 may be implemented as part of model training system 155, or as part of a separate computing system. For example, portions of codified OTA data collection system 135 may be implemented by a separate machine monitoring service that is configured to periodically collect data from human-curation systems 120(1)-(N) and intrinsic attribute collection systems 105(1)-(N) at disparate locations.

Codified OTA data collection system 135 is configured to collect intrinsic attributes 140(1)-(N) from intrinsic attribute collection systems 105(1)-(N) and subjective attributes from human-curation systems 120(1)-(N). Each sterile set 110(1)-(N) may include one or more sterile inputs 115(1)-(N) about one or more vulnerabilities that may be present in one or more computing devices connected in a network. These computing devices can each be protected by a vulnerability management solution (e.g., InsightVM—implemented in the cloud or on premises). Each curated set 125(1)-(N) may include one or more curated inputs 130(1)-(N) about at least an attacker value and an exploitability value of one or more vulnerabilities.

Codified OTA data collection system 135 constructs training datasets 152 by combining data from intrinsic attribute collection systems 105(1)-(N) (e.g., intrinsic attributes 140(1)-(N)) and human curation systems 120(1)-(N) (e.g., subjective attributes 145(1)-(N)) using a common matching key (e.g., vuln. matching keys 150(1)-(N)). Training dataset 152 includes a number of observation records constituting "observations" that are part of the sterile sets. Each observation record may include a set of independent variables 160, which includes intrinsic attributes 140(1)-(N), and one or more target variables 165, which indicates subjective attributes 145(1)-(N). In some embodiments, subjective attributes 145(1)-(N) may be used as the truth label for each observation record to be used to train OTA model 170. In other embodiments, target variable 165 may be at least two numerical values (e.g., a first numerical value (a number from 1 to 5, with 1 indicating "low" attacker value and 5 indicating "high" attacker value) and a second numerical value (a number from 1 to 5, with 1 indicating "low" exploitability value and 5 indicating "high" exploitability value). Model training system 155 may provide a configuration or feature engineering interface to allow users to specify what types of intrinsic attributes or opinionated assessment input(s) to use to train OTA model 170.

Model training system 155 may implement a model updater 180, which may be configured to train OTA model 170 using one or more machine learning techniques 175. Depending on the embodiment, OTA model 170 may be implemented using a variety of different types of machine learning models, including decision tree models, neural networks, linear or logistic regression models, support vector machines, and the like. In some embodiments, OTA model 170 may include an ensemble of multiple machine learning models, possibly of different model types. OTA model 170 may be trained using a supervised training process. During this type of process, the observation records in training dataset 152 are labeled with known output (e.g., opinionated threat assessment results related to attacker value and exploitability).

Next, the training data is fed into OTA model 170 to generate determinations of target variable 165 (e.g., numerical attacker and exploitability values). OTA model 170's determinations as to opinionated threat assessment can be compared against the truth labels of the training records, and OTA model 170's assessment parameters can be adjusted based on the accuracy of its opinionated threat assessment determination. Over many iterations of the training process, the assessment parameters of OTA model 170 can be fine tuned for accuracy.

Depending on the embodiment, machine learning tools and platforms such as SCIKIT-LEARN, TENSORFLOW, AMAZON SAGEMAKER, AZURE ML STUDIO, or JUPYTER NOTEBOOK may be used. Once OTA model 170 is sufficiently trained (e.g., when OTA model 170 satisfies a model evaluation criterion based on an evaluated training dataset), OTA model 170 is deployed to an OTA system 185. OTA system 185 may be used to make opinionated threat assessment decisions for intrinsic attributes 140(1)-(N) collected from intrinsic attribute collection systems 105(1)-(N) like CVSS, among others. Using OTA model 170, OTA system 185 generates an opinionated assessment 199 to determine attacker and exploitability values for vulnerabilities based on just new intrinsic attributes 195 associated with those vulnerabilities—without requiring new subjective attributes 145(1)-(N) or human-inputs (e.g., from human curation systems 120(1)-(N)), and without having to manually codify numerical scores around attacker value and exploitability, which can be unduly burdensome.

In some embodiments, OTA system 185 may be configured to continuously monitor opinionated assessment(s) 199 of a set of sterile inputs 115(1)-(N) indicated by intrinsic attributes 140(1)-(N) from codified OTA data collection system 135. If opinionated assessment(s) 199 exceed a certain threshold for attacker value and exploitability, an alert or notification may be generated to a security analyst.

If opinionated assessment(s) 199 abruptly change for a given vulnerability, automated actions can be triggered by OTA system 185 (e.g., sandboxing, quarantining machines, and the like). In some embodiments, OTA system 185 may employ a cloud-based hosting and management service such as GOOGLE CLOULD ML ENGINE or AMAZON SAGE-MAKER.

Example of Leveraging Intrinsic Attribute Systems and Human Curation Systems

Figure 2:
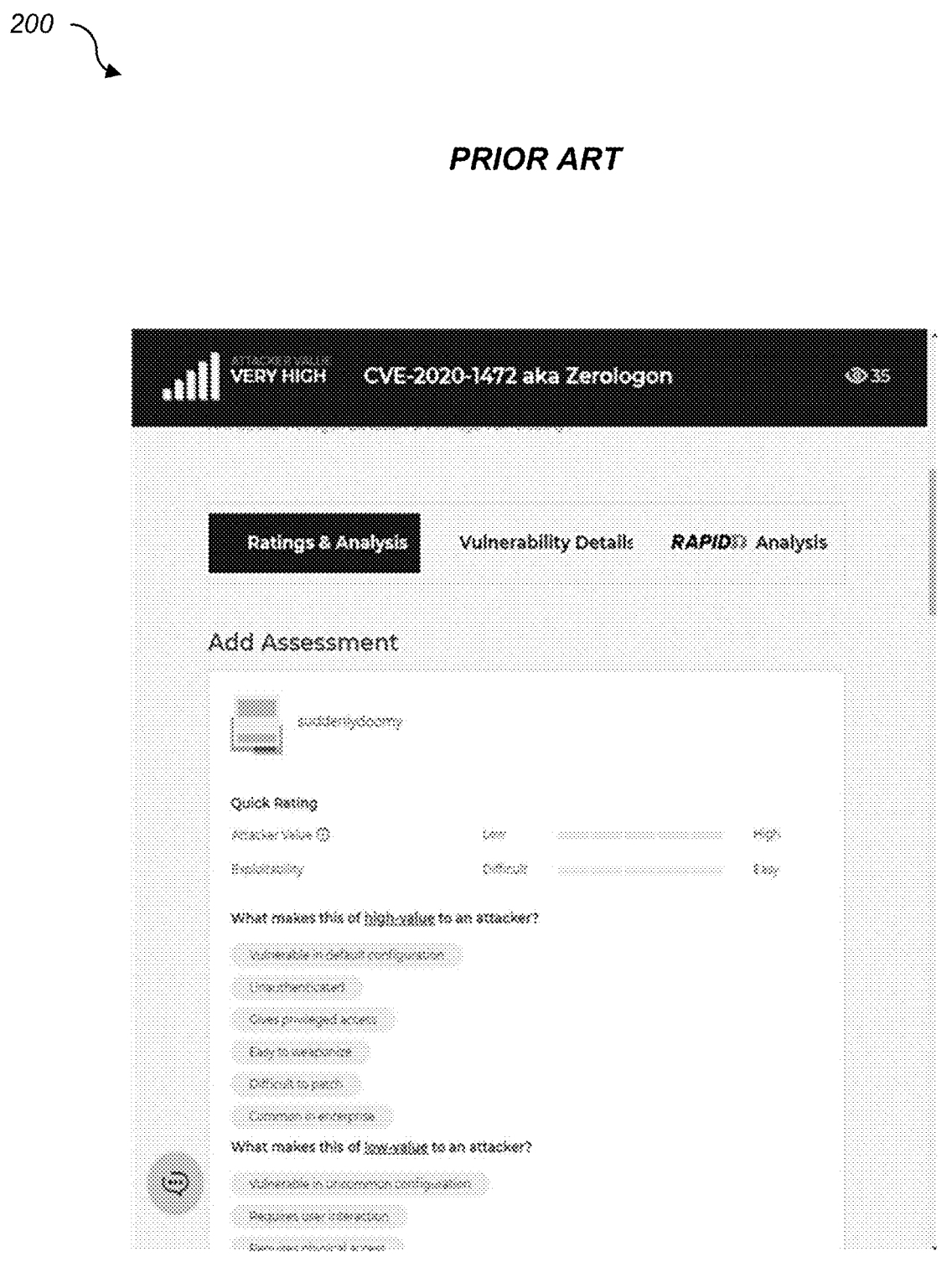

FIG. 2 is a block diagram 200 of AttackerKB's user interface. As noted, existing techniques for assessing the threats posed by cybersecurity vulnerabilities typically require significant human expertise and examination. One such source for human-curated assessments, among others, is AttackerKB. FIG. 2 presents a screenshot of an exemplary interface from AttackerKB. After logging in to the AttackerKB service with their credentials, a user is prompted to select a cybersecurity vulnerability of interest. The various vulnerabilities may be organized by name (e.g., "Zerologon"), by description (e.g., Zyxel USG Hard-Code Admin Creds"), or by CVE number (e.g., CVE-2020-1505"). A CVE (Common Vulnerabilities and Exposures) number is a record—each containing an identification number, a description, and at least one public reference—created by a recognized participant for tracking publicly known security vulnerabilities. As shown in FIG. 2, once the user has selected a particular vulnerability, the user is prompted to rate the vulnerability in terms of, for example, its value to an attacker and its exploitability, and to highlight particular features that make the vulnerability more or less valuable to an attacker or exploitable. Individual ratings from various users can be aggregated or averaged for particular vulnerabilities. The result is a high-quality data set that enables other users to quickly assess the attacker value, exploitability, etc., of various security vulnerabilities. However, the technique relies on the volunteer efforts of trained and interested security professionals, which necessarily limits the number and timeliness of vulnerability ratings.

In various embodiments, intrinsic attribute details (e.g., intrinsic attributes 140(1)-(N)) collected through systems (e.g., intrinsic attribute collection systems 105(1)-(N)) like the CVSS and opinionated assessments (e.g., subjective attributes 145(1)-(N)) collected through systems (e.g., human curation systems 120(1)-(N)) like AttackerKB can be leveraged together as independent and dependent (target) variables, respectively. These paired data sets are then used to develop a supervised machine learning regression model that can receive one or more quantitative or qualitative attributes (e.g., low/medium/high, changed/unchanged, operating system target, etc.) and output estimated quantified values for such factors as attacker value and exploitability which can be recorded on a numerical scale.

Several embodiments may use sets of vulnerability data (e.g., intrinsic attributes 140(1)-(N)) and opinionated assessments (e.g., subjective attributes 145(1)-(N)) to train a machine learning model (e.g., OTA model 170). The training set of vulnerability data may consist of various intrinsic attribute details associated with a vulnerability including, but not limited to, the relevant attack vector, the age of the vulnerability, the complexity of the vulnerability, and the method of user interaction with the vulnerability. The training set of opinionated assessments are, for example, human-generated opinions as to the attacker value or exploitability of the vulnerability. Features such as the CVE number or description can be used to link entries between the data sets, associating the opinionated assessments with the attribute details for the vulnerabilities (e.g., vulnerability matching keys 150(1)-(N)) to create training dataset(s) 152.

The trained model can then associate certain levels or features of the opinionated assessments with various aspects or features of the vulnerability data. Features for other vulnerabilities (new, unrated, or otherwise) may then be presented to the trained model (e.g., OTA model 190), which will respond with synthetic opinionated assessments that may then be made available to other users or utilized in subsequent remediation activities.

Advantageously, a machine learning model-driven approach allows for the possibility of quickly generating thousands of estimated values for fields that traditionally are defined manually by trained experts over extended periods of time. One application of such an approach is to utilize the machine learning model to generate estimates of AttackerKB attacker values and exploitability values for vulnerabilities that have not yet received human assessments, and then present those estimates explicitly identified as machine-generated values. Users of AttackerKB can choose to rely only on human-generated values, which remain few in number, or to use machine-generated values in the absence of or in combination with human ratings.

Example of Generating an OTA Model Output

Figure 3:
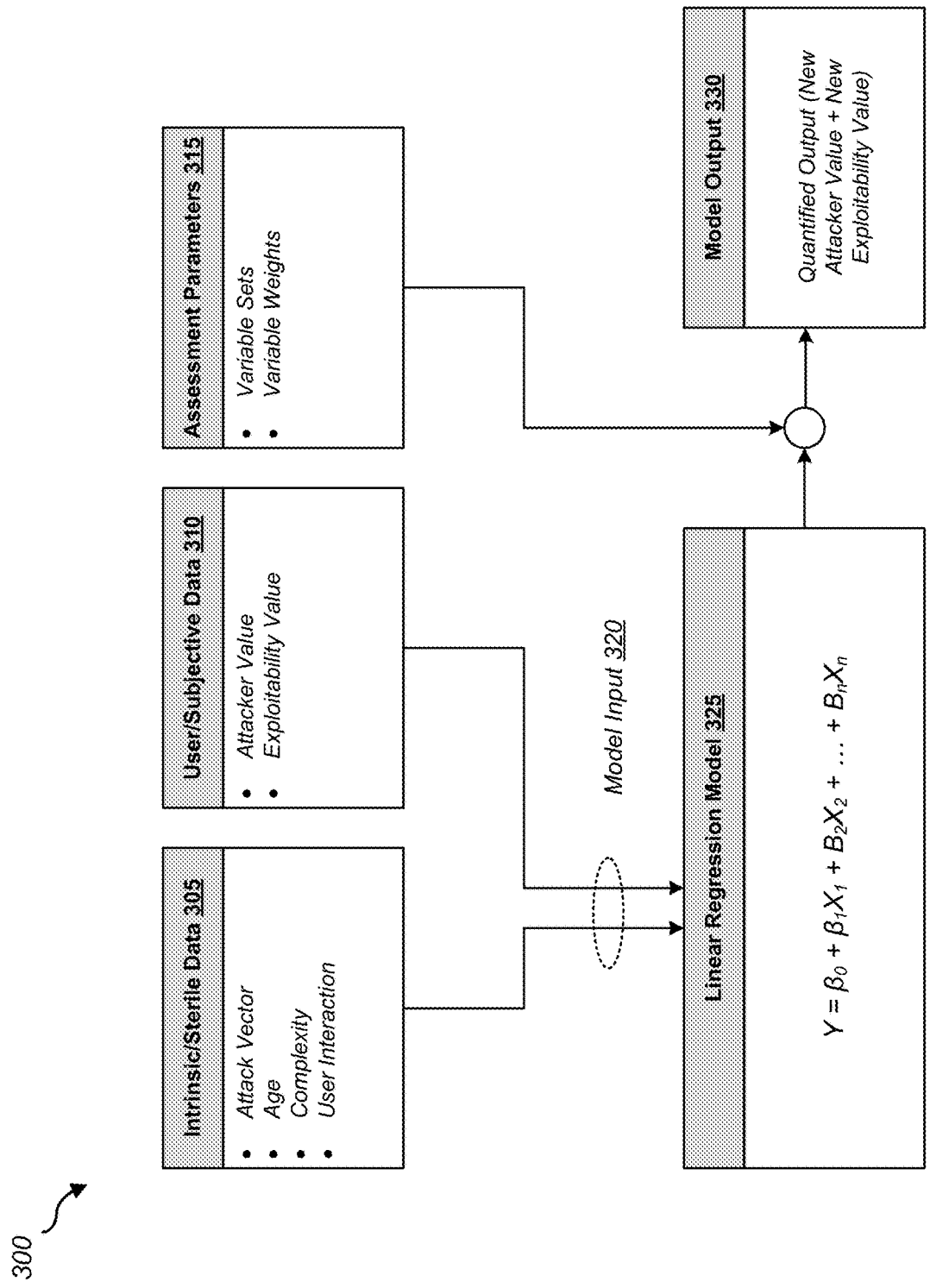
FIG. 3 is a block diagram 300 of a machined learned opinionated threat assessment model, according to one embodiment of the present disclosure.

FIG. 3 is a block diagram 300 of using a linear regression model 325 to process model inputs and generate a model output 330, according to certain embodiments. In addition to intrinsic/sterile data 305 and user/subjective data 310 that become part of the disclosed machine learning process, another type of configuration that can be made through a configuration interface is assessment parameters 315. In some embodiments, such parameters can be adjusted outside of the machine learning process. For example, assessment parameters may dictate how many different instances of decision trees are to be used in a random forest model, how many layers will be used by a neural network, any regularization parameters to be used during training, particular interpretive thresholds used to translate the model's output into classified results, and the like. In other embodiments, the configuration interface may also permit a security analyst or practitioner to specify the scope of data collection (e.g., whether certain sterile sets are to be included, how often to collect training data, how to filter or sample the training data, and the like).

Linear regression model 325 may be an embodiment of OTA model 170 or OTA model 190 of FIG. 1. However, in other embodiments, other types of machine learning models such as decision tree models, neural networks, support vector machines, and the like, are also contemplated. FIG. 3 also illustrates various examples of intrinsic/sterile data 305 and user/subjective data 310 that can be used as a model input 320. Examples of intrinsic/sterile data 305 include, but are not limited to, attack vector, age, complexity, and user interaction. Examples of user/subjective data 310 include, but are not limited to, attacker value and exploitability value. As will be appreciated by those skilled in the art, the types of input data shown here are merely examples. A variety of other types of data may be used as input to the OTA model(s) to perform opinionated threat assessments, without departing from the spirit of disclosure.

Example Processes to Generate Opinionated Threat Assessments

Figure 4:
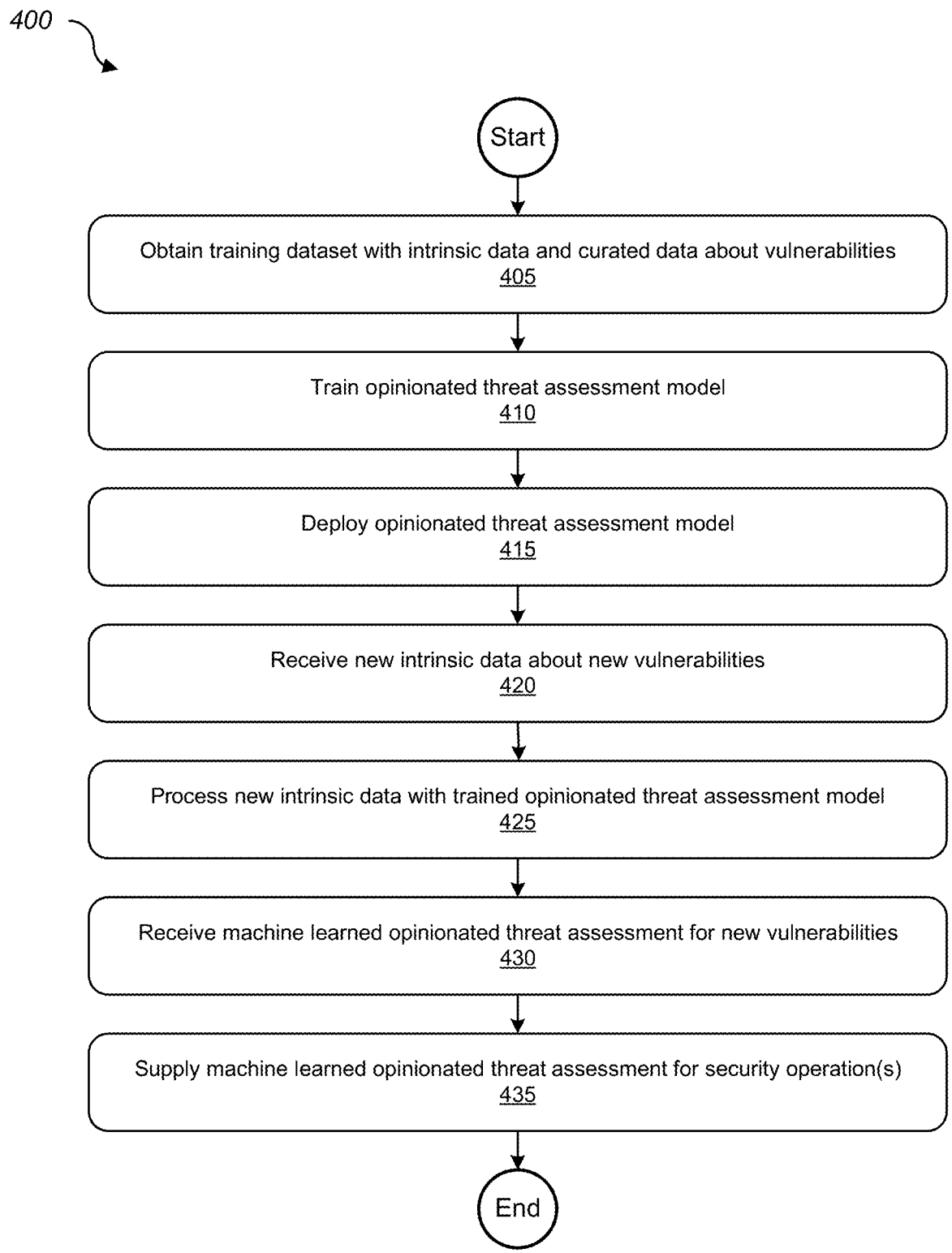
FIG. 4 is a flowchart 400 illustrating a process for supplying machined learned opinionated threat assessment(s) for security operation(s), according to one embodiment of the present disclosure.

FIG. 4 is a flowchart 400 illustrating a process for supplying machined learned opinionated threat assessment(s) for security operation(s), according to one embodiment. The process begins at 405 by obtaining a training dataset with intrinsic data (e.g., vulnerability data)

and curated data (e.g., opinionated assessments) about vulnerabilities. At 410, the process trains an OTA model (e.g., OTA model 170), and at 415, deploys the OTA model. At 420, the process receives new intrinsic data about new vulnerabilities. At 425, the process processes the new intrinsic data (e.g., new intrinsic attributes 195) with (trained) OTA model (e.g., OTA model 190). At 430, the process receives a machined learned opinionated threat assessment for the new vulnerabilities (e.g., opinionated assessment 199). The process ends at 435 by supplying the machined learned opinionated threat assessment for a security operation (e.g., to be performed by a vulnerability management product such as InsightVM).

In some embodiments, the process involves receiving intrinsic attribute details at a processor configured to execute computer-readable instructions. The intrinsic attribute details can be received through an interface to a computer-readable medium, via a network connection, or, in some embodiments, may be entered directly by an operator. The intrinsic attribute details consist of factual (objective) information such as attack vectors, age, complexity, and user interaction requirements and may be supplied by the CVSS or any other intrinsic attribute collection system. In other embodiments, the process involves receiving opinionated assessments at potentially the same or a different processor from, again, an interface, operator entry, etc. The assessments typically consist of human input on subjective attributes such as attacker value and exploitability collected through a human-facing system such as AttackerKB. These lists are non-exhaustive, and it is contemplated that other intrinsic attribute details and opinionated assessments in addition to or in lieu of those mentioned here or throughout the application may be considered as well.

The process then involves the training of a machine learning model, such as a regression model, using the received intrinsic attribute details and opinionated assessments. This process often begins by combining the two data sets using a common matching key, such as the CVE key described above and, again, may use the same processor involved in the receipt of intrinsic attribute data and opinionated assessments or a different processor. Next, the OTA model is trained to generate quantified outputs for one or more of the assessment values, such as attacker value or exploitability. In effect, the OTA model training step extrapolates the implicit relationships between the intrinsic attributes and the human-given opinionated assessments for the vulnerability records that received some sort of human rating. The training step may optionally include an iterative, tuning process, whereby variable sets, weights, and other modeling attributes are altered to reduce the OTA model's overall error rate and improve the OTA model's overall accuracy, specificity, and sensitivity.

In certain embodiments, the process involves receiving intrinsic attribute details at a processor configured to execute computer-readable instructions to act with respect to data. The intrinsic attribute details can be received through an interface to a computer-readable medium (such as a volatile or non-volatile memory), via a network connection, or, in some embodiments, may be entered directly by an operator. The intrinsic attribute details consist of factual information such as attack vectors, age, complexity, and user interaction requirements and may be supplied by the CVSS or any other intrinsic attribute collection system. The process then involves supplying the received details to a processor configured to execute computer-readable instructions implementing a trained machine learning model, such as a regression model. The received details are supplied as inputs to the trained model. The processor may be the same processor as the processor receiving the details or a different processor.

Next, the process involves receiving one or more synthetic opinionated assessments from the trained model after it receives the intrinsic attribute details. The opinionated assessments typically concern subjective attributes such as attacker value and exploitability. They may be generated when no human assessments have been supplied, or they may be supplied in addition to other, human-generated assessments (and optionally labelled as such). This list is non-exhaustive, and it is contemplated that other opinionated assessments in addition to or in lieu of those mentioned here or throughout the application may be considered as well.

Finally, the process involves supplying the synthetic assessment to, for example, an operator, a vulnerability tracking system, a database, and the like. This can involve, for example, a notification via a user interface or a configuration interface in the form of an audio-based alert, visual-based alert, a haptic-based alert, or some combination thereof, a submission to a website, a direct entry to a database, a transmitted communication to a vulnerability analysis service, and the like. In other embodiments, additional actions may be taken, such as recommending various remediations appropriate to the vulnerability or automatically implementing one or more remediations associated with the vulnerability. Various embodiments can treat this as an iterative process, re-training the model from time-to-time as more human inputs are received to extend the generalizability of the model.

Additional Embodiments

As noted, threat assessments of cybersecurity require significant human expertise and examination, often by individuals trained and experienced in such domains as penetration testing. Collecting such human inputs to assess the true threat of vulnerabilities is typically labor-intensive and slow, and thus often limited in scale and scope. Rapid7®, Inc. of Boston, MA operates AttackerKB, a service to collect opinionated feedback from knowledgeable security practitioners about the usefulness of particular vulnerabilities to attackers. A portion of that feedback has to be laboriously codified as numerical scores around attacker value and exploitability (among other metrics such as previous success, longevity, danger level, and the like). Given the high manual effort requirement, the number of human inputs to AttackerKB so far, which are rich in detail and quality, remains sparse. For comparison, to date, there are about 300 vulnerabilities with (necessary and useable) inputs in AttackerKB, while InsightVM tracks over 170,000 distinct vulnerabilities. It remains unlikely that a large set of known vulnerabilities will ever receive AttackerKB assessments if we are solely to rely on human input.

In one embodiment, by combining intrinsic attribute details collected through systems like the Common Vulnerability Scoring System (CVSS) (among other scoring sources) and the opinionated assessments in AttackerKB (among other assessment sources), the two sets of data are leveraged together as independent and dependent variables, respectively. The intrinsic values recorded by CVSS include details on attributes like attack vectors, age, complexity, and user interaction requirements, among dozens of other attributes.

Unfortunately, CVSS or equivalent systems do not provide insights on how popular or useful a particular vulnerability might be to potential attackers, which is a domain often better served by human input. It should be noted that in addition to CVSS, other data sources can also be incorporated (e.g., a list of validated vulnerabilities, a list of unvalidated vulnerabilities, and the like) and can potentially be used for model training purposes.

With such a salient framing around the data, in some embodiments, a supervised machine learning regression model is developed. The model can receive, accept, or be provided input data where the intake is a set of quantitative or qualitative attributes (e.g., low/medium/high, changed/unchanged, targets Windows/MAC/Linux/Java/Adobe, and the like) and can output quantified values that represent best attempts at deriving values for such factors as attacker value and exploitability (e.g., recorded on a 0-5 numerical scale, among other types of scaling). As noted, other factors such as previous success, longevity, danger level, and the like, are contemplated.

Advantageously, a machine learning model-driven approach allows for the possibility of quickly generating thousands of estimated values for fields that traditionally are defined manually by people over extended periods of time. Utilization of human training in a machine-drive process to expedite the generation of useful security data in a domain that is highly dependent on opinionated assessments. Although collecting human inputs on vulnerabilities has great value in such situations, the actual collection will always remain sparse (e.g., compared to the number of existing and new vulnerabilities in the security ecosystem). Therefore, the methods, systems, processes, and models disclosed herein by leverage only available human inputs to significantly extend the assessment of other (e.g., new or un-assessed vulnerabilities)—e.g., vulnerabilities that have not received and will probably not receive human assessment.

In some embodiments, the model generation and training involves at least the following steps: (1) collecting or receiving human input on at least such subjective attributes as attacker value and exploitability through AttackerKB or any other human curation system, (2) collecting or receiving sterile inputs on vulnerabilities through CVSS or any other intrinsic attribute collection system, (3) combining data from AttackerKB and CVSS using a common matching key, such as Common Vulnerabilities and Exposures (CVE) identifier numbers, among other types, (4) training at least a regression model that generates quantified outputs for at least each of attacker value and exploitability (the model generation process extrapolates the implicit relationships between attributes from CVSS and the human defined values in AttackerKB for the vulnerability records that have received some sort of human input, (5) iteratively tuning the model by altering variable sets, weights, and other modeling attributes to reduce the overall error rate, and improve the overall accuracy, specificity, and sensitivity, (6) utilizing the trained model to intake intrinsic attributes and generate estimates for typically human-defined values, like attacker value and exploitability, in cases where no human input has yet been provided, and (7) re-training the model periodically as more human inputs are received to extend the generalizability of the model and decrease the likelihood of biased modeling.

In one embodiment, instead of a logistic regression (which outputs a probability outcome in the 0-1 range), OTA model 190 performs a linear regression (which outputs a quantified value that corresponds to the range of inputs (e.g., 1-5 given AttackerKB inputs or any other human curated system inputs). In another embodiment, OTA model 190 can generate approximately 30,000 predictions for attacker value and exploitability for AttackerKB, out of a full possible set of over 170,000—representing a 100-fold increase over the available set of true AttackerKB inputs.

In certain embodiments, the machined learned opinionated threat assessment that is supplied for a security operation can be used to perform the at least following security operations: (a) vulnerability re-validation (e.g., further validation against particular vulnerabilities to re-confirm said vulnerabilities), (b) vulnerability re-assessment (an internal re-ranking of the CVSS score based on quantified outputs of attacker value and exploitability value), (c) a modification of alerts in an intrusion detection system (IDS) to generate updated detection messages based on the re-validation and/or re-assessment, (d) generation of a security workflow in a security orchestration, automation, and response (SOAR) system to automatically perform (or cause other tools and solutions to perform) a vulnerability re-validation followed by a vulnerability re-assessment, and further followed by an updating of IDS alerts, (e) transmitting an instruction to an agent executing on an endpoint computing device to update locally stored IDS rules (e.g., stale IDS rules) and/or modify vulnerability remediation priorities based on the quantified output (in addition to collecting data about specific process events on the endpoint applicable to the heightened-risk vulnerabilities), and/or (f) verifying one or more vulnerabilities with high attacker and exploitability values with specific exploits to optimize or prioritize remediation.

Example Computing and Networking Environment

Figure 5:
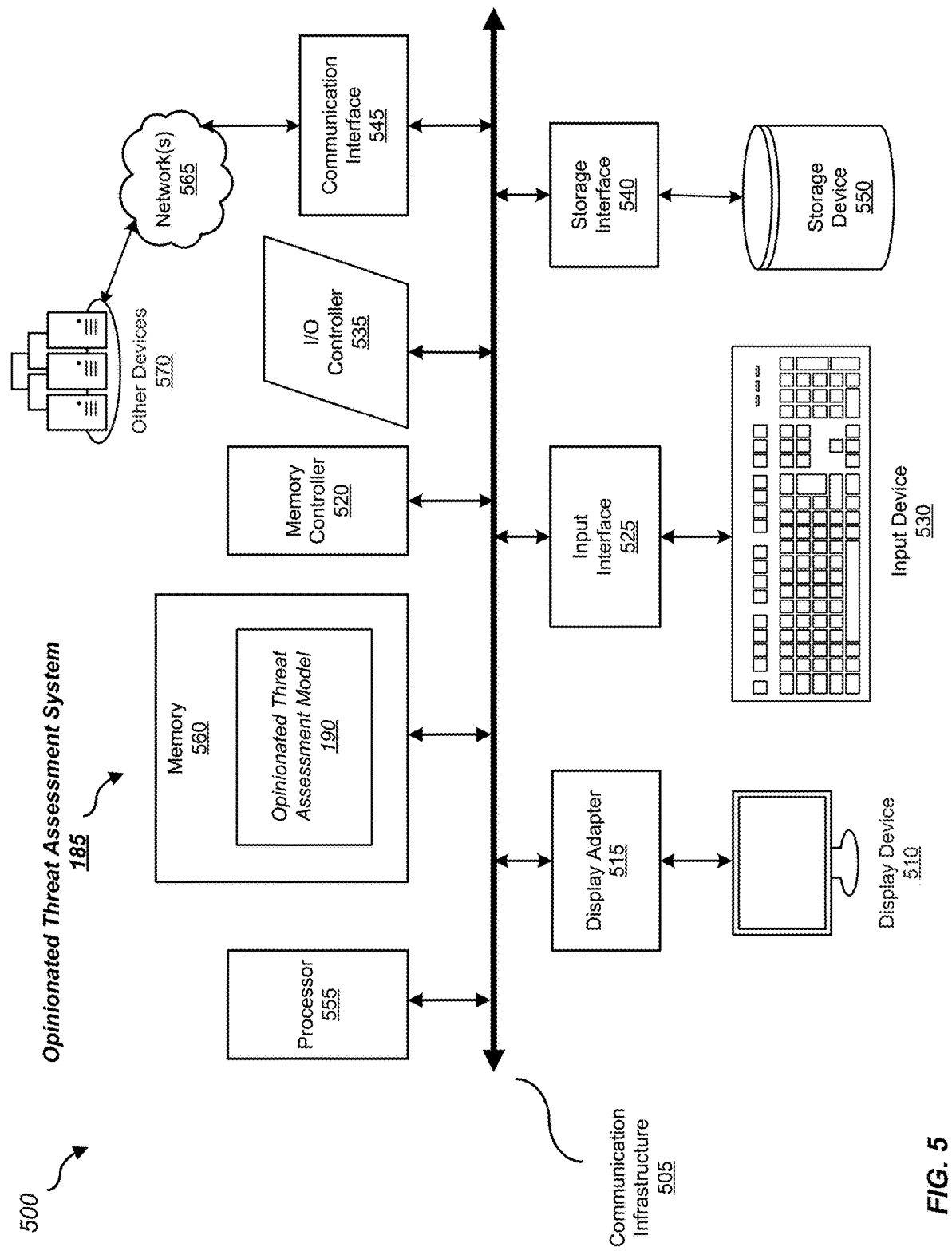
FIG. 5 is a block diagram 500 of a computing and networked system, illustrating how an opinionated threat assessment model can be implemented in software, according to one embodiment of the present disclosure.

FIG. 5 is a block diagram 500 of a computing system, illustrating how an OTA system can be implemented in software, according to one embodiment. Computing system 500 can include OTA system 185 and broadly represents any single or multi-processor computing device or system capable of executing computer-readable instructions (e.g., workstations, personal computers, laptops, client-side terminals, servers, distributed systems, handheld devices, appliances, and the like). In its most basic configuration, computing system 500 may include at least one processor 555 and a memory 560. By executing the software that executes OTA model 190 (or OTA model 170) computing system 500 becomes a special purpose computing device that is configured to perform machined learned opinionated threat assessments of security vulnerabilities.

Processor 555 generally represents any type or form of processing unit capable of processing data or interpreting and executing instructions. In certain embodiments, processor 555 may receive instructions from a software application or module. These instructions may cause processor 555 to perform the functions of one or more of the embodiments described and/or illustrated herein. For example, processor 555 may perform and/or be a means for performing all or some of the operations described herein. Processor 555 may also perform and/or be a means for performing any other operations, methods, or processes described and/or illustrated herein.

Memory 560 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments, computing system 500 may include both a volatile memory unit and a non-volatile storage device. In one example, program instructions implementing OTA model 190 or OTA model 170 may be loaded into memory 560.

In certain embodiments, computing system 500 may also include one or more components or elements in addition to processor 555 and/or memory 560. For example, as illustrated in FIG. 5, computing system 500 may include a memory controller 520, an Input/Output (I/O) controller 535, and a communication interface 545, each of which may be interconnected via a communication infrastructure 505. Communication infrastructure 505 generally represents any type or form of infrastructure capable of facilitating communication between one or more components of a computing device. Examples of communication infrastructure 505 include, without limitation, a communication bus (such as an Industry Standard Architecture (ISA), Peripheral Component Interconnect (PCI), PCI express (PCIe), or similar bus) and a network.

Memory controller 520 generally represents any type/form of device capable of handling memory or data or controlling communication between one or more components of computing system 500. In certain embodiments, memory controller 520 may control communication between processor 555, memory 560, and I/O controller 535 via communication infrastructure 505. In certain embodiments, memory controller 520 may perform and/or be a means for performing, either alone or in combination with other elements, one or more of the operations or features described and/or illustrated herein. I/O controller 535 generally represents any type or form of module capable of coordinating and/or controlling the input and output functions of a computing device. For example, in certain embodiments I/O controller 535 may control or facilitate transfer of data between one or more elements of computing system 500, such as processor 555, memory 560, communication interface 545, display adapter 515, input interface 525, and storage interface 540.

Communication interface 545 broadly represents any type/form of communication device/adapter capable of facilitating communication between computing system 500 and other devices and may facilitate communication between computing system 500 and a private or public network. Examples of communication interface 545 include a wired network interface (e.g., network interface card), a wireless network interface (e.g., a wireless network interface card), a modem, and any other suitable interface. Communication interface 545 may provide a direct connection to a remote server via a direct link to a network, such as the Internet, and may also indirectly provide such a connection through, for example, a local area network. Communication interface 545 may also represent a host adapter configured to facilitate communication between computing system 500 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 500 may also include at least one display device 510 coupled to communication infrastructure 505 via a display adapter 515 that generally represents any type or form of device capable of visually displaying information forwarded by display adapter 515. Display adapter 515 generally represents any type or form of device configured to forward graphics, text, and other data from communication infrastructure 505 (or from a frame buffer, as known in the art) for display, on display device 510. Computing system 500 may also include at least one input device 530 coupled to communication infrastructure 505 via an input interface 525. Input device 530 generally represents any type or form of input device capable of providing input, either computer or human generated, to computing system 500. Examples of input device 530 include a keyboard, a pointing device, a speech recognition device, or any other input device.

Computing system 500 may also include storage device 550 coupled to communication infrastructure 505 via a storage interface 540. Storage device 550 generally represents any type or form of storage devices or mediums capable of storing data and/or other computer-readable instructions. For example, storage device 550 may include a magnetic disk drive (e.g., a so-called hard drive), a floppy disk drive, a magnetic tape drive, an optical disk drive, a flash drive, or the like. Storage interface 540 generally represents any type or form of interface or device for transmitting data between storage device 550, and other components of computing system 500. Storage device 550 may be configured to read from and/or write to a removable storage unit configured to store computer software, data, or other computer-readable information. Examples of suitable removable storage units include a floppy disk, a magnetic tape, an optical disk, a flash memory device, or the like. Storage device 550 may also include other similar structures or devices for allowing computer software, data, or other computer-readable instructions to be loaded into computing system 500. For example, storage device 550 may be configured to read and write software, data, or other computer-readable information. Storage device 550 may also be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from that shown in FIG. 5. Computing system 500 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 500 for storage in memory via a network such as the Internet or upon a carrier medium.

The computer-readable medium containing the computer program may be loaded into computing system 500. All or a portion of the computer program stored on the computer-readable medium may then be stored in memory 560, and/or various portions of storage device 550. When executed by processor 555, a computer program loaded into computing system 500 may cause processor 555 to perform and/or be a means for performing the functions of one or more of the embodiments described/illustrated herein. Alternatively, one or more of the embodiments described and/or illustrated herein may be implemented in firmware and/or hardware.

Network 565 generally represents any type or form of computer network or architecture capable of facilitating communication between OTA system 185 and intrinsic attribute collection systems 105(1)-(N), and/or human curation systems 120(1)-(N). For example, network 565 can be a Wide Area Network (WAN) (e.g., the Internet) or a Local Area Network (LAN). In certain embodiments, a communication interface, such as communication interface 545 in FIG. 5, may be used to provide connectivity between OTA system 185 and intrinsic attribute collection systems 105(1)-(N), and/or human curation systems 120(1)-(N), and network 565. Codified opinionated threat assessment data collection system 135, model training system 155, and OTA system 185 may be implemented together (e.g., in an OTA server) or can be implemented separately. The embodiments described and/or illustrated herein are not limited to the Internet or any particular network-based environment.

In some embodiments, codified opinionated threat assessment data collection system 135 and model training system 155 may be part of OTA system 185 respectively, or may be separate. If separate, codified opinionated threat assessment data collection system 135 and model training system 155, and OTA system 185 may be communicatively coupled via network 565. In one embodiment, all, or a portion of one or more of embodiments may be encoded as a computer program and loaded onto and executed by OTA system 185 or the OTA server or any combination thereof and may be stored on the "cloud" and distributed over network 565. In some examples, all or a portion of codified OTA data collection system 135, model training system 155, OTA system 185, and/or the OTA server may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, OTA model 190 may transform the behavior of OTA system 185 to perform machined learned opinionated threat assessment for cybersecurity vulnerabilities.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
   performing, by one or more hardware processors with associated memory that implement an opinionated threat assessment system:
   obtaining a training dataset comprising a codified opinionated threat assessment for each of one or more security vulnerabilities, wherein
     each codified opinionated threat assessment in the training dataset comprises one or more intrinsic attributes and one or more subjective attributes for each of the one or more security vulnerabilities;
   training an opinionated threat assessment model using the training dataset and according to a machine learning technique, wherein
     the training tunes the opinionated threat assessment model to generate a machine learned opinionated threat assessment for a new security vulnerability based on one or more new intrinsic attributes associated with the new security vulnerability;
   receiving, from an intrinsic attribute collection system, a first dataset comprising one or more sterile inputs indicative of the one or more intrinsic attributes;
   receiving, from a human curation system, a second dataset comprising one or more user-generated inputs indicative of the one or more subjective attributes; and
   generating the codified opinionated threat assessment for the training dataset by combining the first dataset and the second dataset using a common matching key for each of the one or more security vulnerabilities.

2. The computer-implemented method of claim 1, wherein
   the intrinsic attribution collection system is a Common Vulnerability Scoring System (CVSS), and
   the one or more intrinsic attributes comprise at least one of attack vector, age, complexity, or user interaction.

3. The computer-implemented method of claim 1, wherein
   the human curation system is an attacker knowledge base (AttackerKB) service, and
   the one or more subjective attributes comprise at least an attacker value and an exploitability value for each of the one or more security vulnerabilities.

4. The computer-implemented method of claim 1, wherein
   the machine learning technique trains a regression model.

5. The computer-implemented method of claim 1, wherein
   the opinionated threat assessment model generates a quantified output comprising a new attacker value and a new exploitability value for the new security vulnerability based only on the one or more new intrinsic attributes associated with the new security vulnerability without requiring one or more new subjective attributes for the new security vulnerability.

6. The computer-implemented method of claim 1, wherein
   training the opinionated threat assessment model comprises extrapolating one or more implicit relationships between the one or more intrinsic attributes and one or more user-defined values for each of the one or more security vulnerabilities that comprise at least one user-generated input.

7. A non-transitory computer readable storage medium comprising program instructions executable to:
   perform, by one or more hardware processors with associated memory that implement an opinionated threat assessment system:
   obtain a training dataset comprising a codified opinionated threat assessment for each of one or more security vulnerabilities, wherein
     each codified opinionated threat assessment in the training dataset comprises one or more intrinsic attributes and one or more subjective attributes for each of the one or more security vulnerabilities;
   train an opinionated threat assessment model using the training dataset and according to a machine learning technique, wherein
     the training tunes the opinionated threat assessment model to generate a machine learned opinionated threat assessment for a new security vulnerability based on one or more new intrinsic attributes associated with the new security vulnerability;
   receive, from an intrinsic attribute collection system, a first dataset comprising one or more sterile inputs indicative of the one or more intrinsic attributes;

receive, from a human curation system, a second dataset comprising one or more user-generated inputs indicative of the one or more subjective attributes; and generate the codified opinionated threat assessment for the training dataset by combining the first dataset and the second dataset using a common matching key for each of the one or more security vulnerabilities.

8. The non-transitory computer readable storage medium of claim 7, wherein the intrinsic attribution collection system is a Common Vulnerability Scoring System (CVSS), the one or more intrinsic attributes comprise at least one of attack vector, age, complexity, or user interaction, the human curation system is an attacker knowledge base (AttackerKB) service, and the one or more subjective attributes comprise at least an attacker value and an exploitability value for each of the one or more security vulnerabilities.

9. The non-transitory computer readable storage medium of claim 7, wherein the machine learning technique trains a regression model, and the trained regression model generates a quantified output comprising a new attacker value and a new exploitability value for the new security vulnerability based only on the one or more new intrinsic attributes associated with the new security vulnerability without requiring one or more new subjective attributes for the new security vulnerability.

10. The non-transitory computer readable storage medium of claim 7, wherein training the opinionated threat assessment model comprises extrapolating one or more implicit relationships between the one or more intrinsic attributes and one or more user-defined values for each of the one or more security vulnerabilities that comprise at least one user-generated input.

11. An opinionated threat assessment system comprising:

one or more processors; and a memory coupled to the one or more processors, wherein the memory stores program instructions executable by the one or more processors to:

perform, by one or more processors with associated memory that implement the opinionated threat assessment system:

obtain a training dataset comprising a codified opinionated threat assessment for each of one or more security vulnerabilities, wherein each codified opinionated threat assessment in the training dataset comprises one or more intrinsic attributes and one or more subjective attributes for each of the one or more security vulnerabilities;

train an opinionated threat assessment model using the training dataset and according to a machine learning technique, wherein the training tunes the opinionated threat assessment model to generate a machine learned opinionated threat assessment for a new security vulnerability based on one or more new intrinsic attributes associated with the new security vulnerability;

receive, from an intrinsic attribute collection system, a first dataset comprising one or more sterile inputs indicative of the one or more intrinsic attributes;

receive, from a human curation system, a second dataset comprising one or more user-generated inputs indicative of the one or more subjective attributes; and generate the codified opinionated threat assessment for the training dataset by combining the first dataset and the second dataset using a common matching key for each of the one or more security vulnerabilities.

12. The system of claim 11, wherein the intrinsic attribution collection system is a Common Vulnerability Scoring System (CVSS), the one or more intrinsic attributes comprise at least one of attack vector, age, complexity, or user interaction, the human curation system is an attacker knowledge base (AttackerKB) service, and the one or more subjective attributes comprise at least an attacker value and an exploitability value for each of the one or more security vulnerabilities.

13. The system of claim 11, wherein the machine learning technique trains a regression model as the opinionated threat assessment model, the opinionated threat assessment model generates a quantified output comprising a new attacker value and a new exploitability value for the new security vulnerability based only on the one or more new intrinsic attributes associated with the new security vulnerability without requiring one or more new subjective attributes for the new security vulnerability, and training the opinionated threat assessment model comprises extrapolating one or more implicit relationships between the one or more intrinsic attributes and one or more user-defined values for each of the one or more security vulnerabilities that comprise at least one user-generated input.

* * * * *